US008187367B2

(12) United States Patent
Wang

(10) Patent No.: US 8,187,367 B2
(45) Date of Patent: May 29, 2012

(54) PORTABLE PSA OXYGEN GENERATOR

(76) Inventor: Dong-lei Wang, Zhuhai (CN)

(*) Notice: Subject to any disclaimer, the term of this patent is extended or adjusted under 35 U.S.C. 154(b) by 363 days.

(21) Appl. No.: 12/701,341

(22) Filed: Feb. 5, 2010

(65) Prior Publication Data

US 2010/0192775 A1 Aug. 5, 2010

Related U.S. Application Data

(63) Continuation-in-part of application No. 11/962,565, filed on Dec. 21, 2007, now abandoned.

(30) Foreign Application Priority Data

Dec. 31, 2006 (CN) .......................... 2006 2 0155692

(51) Int. Cl.
*B01D 53/047* (2006.01)
(52) U.S. Cl. .............................. 96/109; 96/121; 96/380
(58) Field of Classification Search .................... 96/109, 96/112, 113, 121, 126–128; 55/490, 357; 128/204.18, 204.21
See application file for complete search history.

(56) References Cited

U.S. PATENT DOCUMENTS

| | | | | |
|---|---|---|---|---|
| 4,342,573 A * | 8/1982 | McCombs et al. | ............... | 96/109 |
| 4,378,982 A * | 4/1983 | McCombs | ....................... | 96/117 |
| 6,805,122 B2 * | 10/2004 | Richey et al. | ............ | 128/205.18 |
| 6,949,133 B2 * | 9/2005 | McCombs et al. | ............... | 96/111 |
| 7,156,903 B2 * | 1/2007 | McCombs | ....................... | 96/109 |
| 7,179,326 B2 * | 2/2007 | Nakamura et al. | ............... | 96/128 |
| 7,510,601 B2 * | 3/2009 | Whitley et al. | .................. | 96/121 |
| 8,016,925 B2 * | 9/2011 | Mccombs et al. | ............... | 96/121 |
| 2006/0117957 A1 * | 6/2006 | McCombs et al. | ............... | 96/121 |
| 2008/0053310 A1 * | 3/2008 | Bliss et al. | ....................... | 96/115 |

* cited by examiner

*Primary Examiner* — Frank Lawrence, Jr.
(74) *Attorney, Agent, or Firm* — Colin P. Cahoon; Celina M. Orr; Carstens & Cahoon, LLP

(57) ABSTRACT

The present invention relates to a portable pressure swing adsorption ("PSA") oxygen generator with at least one partition board disposed inside its housing; an oil-free compressor and a control valve assembly are disposed in one of the separated space isolated by at least one fixing board and the at least one partition board; wherein a fan is disposed inclined or vertically on the partition board outside of the isolated space so that air can be blown into the isolated space directly by an air outlet of the fan. The present invention is built in compact structure with small size and light weight to carry and move, and works safely with a choice of three different types of power supplies, which enable the oxygen generator of the present invention to be used more widely than conventional ones.

6 Claims, 3 Drawing Sheets

PORTABLE PSA OXYGEN GENERATOR

CROSS-REFERENCE TO RELATED APPLICATION

This application is a continuation-in-part of U.S. patent application Ser. No. 11/962,565, filed Dec. 21, 2007, now abandoned, the technical disclosure of which is hereby incorporated by reference.

FIELD OF THE INVENTION

The present invention relates to a portable pressure swing adsorption ("PSA") oxygen generator for medical use.

BACKGROUND OF THE INVENTION

Along with the rapid development of science technology, the pace of life and work in modern society is faster and faster, accordingly people have to do more brain works, and office workers are more likely to have negative physiological reactions such as headache; in addition, our living environment is getting worse due to the rapid industry development, and many areas are affected by serious air pollutions. In order to improve the environment and people's health, oxygen therapy and oxygen healthcare are very important and irreplaceable with broad development prospects. For those people under long-term oxygen therapy and oxygen healthcare treatment, they prefer to have a new type of medical oxygen generator which can be carried and moved easily with small size and light weight, and which can work safely and economically with a choice of different types of power supplies. Nowadays, oxygen cylinders, oxygen bags, chemical oxygen generators and mini PSA oxygen generators are mainly used but they have the following disadvantages: (1) Although oxygen cylinders and oxygen bags can be carried easily, there are potential safety risks during intake of oxygen, and continuous oxygen supply is not available since oxygen cylinders and oxygen bags are pressure vessels; (2) chemical oxygen generators are in small size with light weight but they can not be reused when they are finished, also they cost expensively to people under long-term oxygen therapy and oxygen healthcare treatment, since extra chemicals should be added periodically; (3) mini PSA oxygen generators can be used at home, but for those people who often go out, they can not be carried easily because they are larger in size with heavy weight and should be supplied only with alternating current. U.S. Pat. No. 6,764,534 issued Jul. 20, 2004 to Norman R. McCombs et al disclosed a portable oxygen generator including a PSA device; in the Norman R. McCombs et al oxygen generator, components are not rationally arranged, especially the heat radiating elements are not isolated, which results in complicated structure and high temperature inside, also it weights up to 5 kg with high production cost and short life time in limited range of applications.

SUMMARY OF THE INVENTION

The present invention is to solve the problems of prior art technology by providing a portable PSA oxygen generator, which is built in compact structure with small size and light weight to carry and move, and works safely with a choice of three different types of power supplies, which enable the oxygen generator of the present invention to be used more widely than conventional ones.

The goal of the present invention is achieved by the following technical scheme:

A portable PSA oxygen generator comprising:

a housing, at least one fixing board, and components including an air filter assembly, an oil-free compressor, a control valve assembly, a PSA oxygen generating assembly, an oxygen supply assembly, a heat dissipation assembly and an electric control assembly;

wherein the oxygen generator further comprises at least one partition board, the at least one fixing board and the at least one partition board divide an interior of the housing into two or more separated spaces, so that said components are disposed within said two or more separated spaces by the sides of the at least one fixing board and/or the at least one partition board;

wherein the oil-free compressor and the control valve assembly are disposed in one of the separated spaces isolated by the at least one fixing board and the at least one partition board; wherein the heat dissipation assembly includes a fan which is disposed on the partition board outside of the isolated space, so that air can be blown into the isolated space directly by an air outlet of the fan;

wherein the PSA oxygen generating assembly includes absorbing tanks and a ventilating muffler, the ventilating muffler is disposed in another separated space isolated by another partition board, and the air which is blown into the isolated space by the fan goes through the ventilating muffler to be exhausted from an air outlet of the housing.

The control valve assembly consists of at least four micro two-position two-way electromagnetic valves which are connected in parallel, or consists of one or more micro two-position five-way pilot-operated air control valves which are connected in parallel.

The PSA oxygen generating assembly includes two or more absorbing tanks which are connected in parallel.

The electric control assembly provides a choice of three different types of power supplies including a rechargeable battery, a regulated power supply and a vehicle power supply.

The electric control assembly further includes pressure & oxygen sensors, and a negative pressure sensor so as to monitor system pressure, oxygen concentration and state of oxygen output to make sure supplying oxygen when inspiring and stop supplying when exhaling.

The heat dissipation assembly includes a temperature controller so as to prevent the working temperature inside the oxygen generator from exceeding a threshold value.

The oxygen generator of the present invention is built in compact structure with small size and light weight of about 2.5 kg to 3 kg, and has good heat dissipation which prolong the life time of the oxygen generator. The oxygen generator of the present invention can be carried easily and works with a choice of three different types of power supplies, therefore, it is suitable for hospitals, homes, offices, public entertainment places, plateau regions and air-conditioned vehicles.

BRIEF DESCRIPTION OF THE DRAWINGS

Further features and advantages of the oxygen generator of the present invention will become apparent from the following detailed description, in combination with the appended drawings, in which:

FIG. 2 (*b*) is a right view of the oxygen generator along A-A of the FIG. 1;

DETAILED DESCRIPTION OF THE PREFERRED EMBODIMENTS

Figure 1:
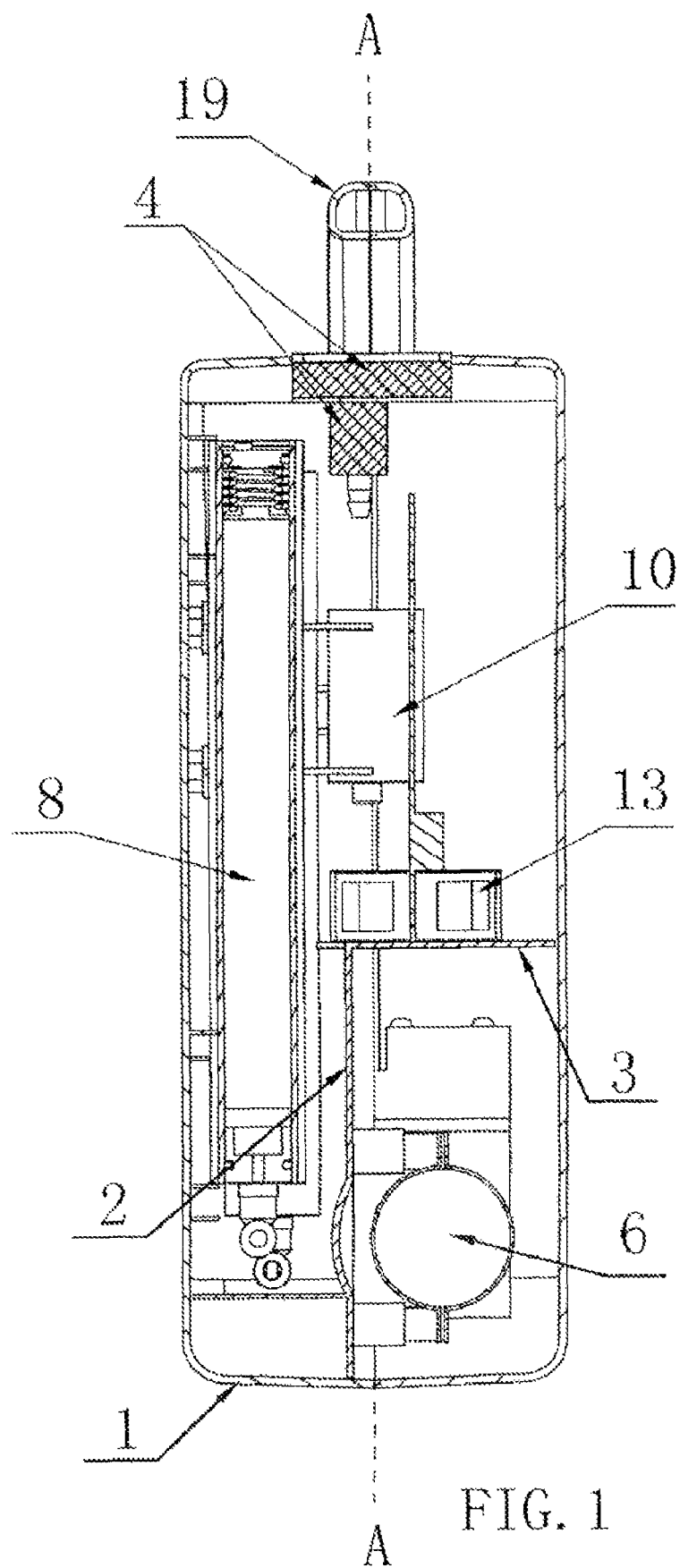
FIG. 1 is a cross-sectional view of a portable PSA oxygen generator according to one embodiment of the present invention.
Figure 2A:
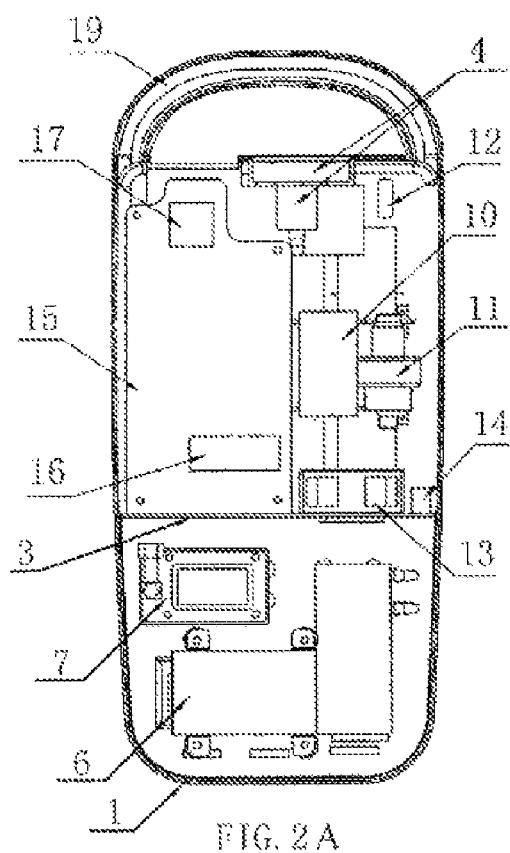
FIG. 2 (*a*) is a left view of the oxygen generator along A-A of the FIG. 1.
Figure 2B:
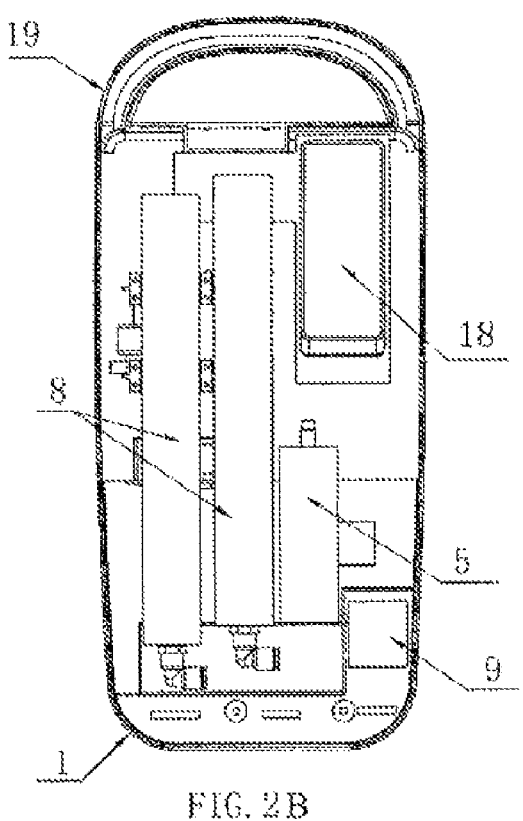
Figure 3:
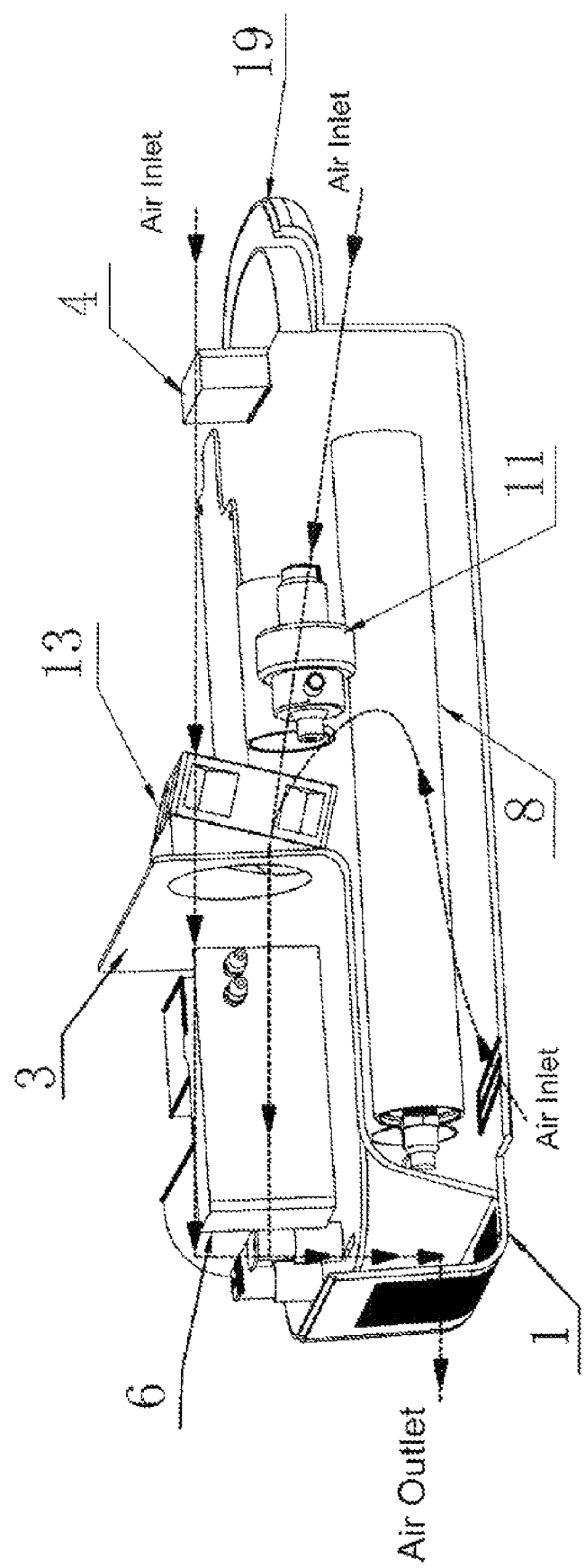
FIG. 3 is a schematic view showing heat dissipation and air ventilation of the oxygen generator as shown in FIG. 1.

As shown in FIGS. 1, 2 (*a*) and 2 (*b*), a portable PSA oxygen generator according to one embodiment of the present invention comprises a housing 1, at least one fixing board 2, an air filter assembly, an oil-free compressor 6, a control valve assembly 7, a PSA oxygen generating assembly, an oxygen supply assembly, a heat dissipation assembly and an electric control assembly.

The air filter assembly includes a filter 4 and an air-intaking muffler 5; the PSA oxygen generating assembly includes absorbing tanks 8 and a ventilating muffler 9, etc; the oxygen supply assembly includes an oxygen tank 10, a pressure reducing valve 11 and a filter 12; the heat dissipation assembly includes a fan 13 and a temperature controller 14; and the electric control assembly includes a PCB board 15, pressure & oxygen sensors 16, a negative pressure sensor 17 and a rechargeable battery 18, etc.

The fixing board 2 is disposed inside the housing 1 for fixing main heat radiating elements such as the oil-free compressor 6 and the control valve assembly 7; the partition board 3 is disposed above the oil-free compressor 6 and the control valve assembly 7 for sealing and airproof, thereby main heat radiating elements such as the oil-free compressor 6 and the control valve assembly 7 are disposed in a separated space isolated by the fixing board 2 and the partition board 3.

The fan 13 is disposed inclined or vertically on the partition board 3 outside of the isolated space so that air can be blown into the isolated space directly by an air outlet of the fan 13; ambient air is blown by the fan 13 from an air inlet of the housing 1 into the oxygen tank 10, then into the pressure reducing valve 11, the PCB board 15 and the absorbing tanks 8, etc, finally the air is blown by the fan 13 into an isolated space to go through an ventilating muffler 9 to be exhausted with useless air from an air outlet of the housing or directly exhausted; wherein the ventilating muffler 9 is disposed in another separated space isolated by another partition board so as to exhaust nitrogen easily.

The control valve assembly 7 consists of at least four micro two-position two-way electromagnetic valves which are connected in parallel, or consists of one or more micro two-position five-way pilot-operated air control valves which are connected in parallel for controlling the air loop within the system.

The PSA oxygen generating assembly includes two or more absorbing tanks 8 which are connected in parallel; wherein said absorbing tanks 8 has zeolite molecular sieve as absorbing material, so that medical oxygen of a concentration of more than 90% can be produced during pressure swing adsorption cycles.

The electric control assembly provides a choice of three different types of power supplies including a rechargeable battery, a regulated power supply and a vehicle power supply; the electric control assembly further includes pressure & oxygen sensors 16, and a negative pressure sensor 17 so as to monitor system pressure, oxygen concentration and state of oxygen output to make sure supplying oxygen when people inspiring and stop supplying oxygen when people exhaling.

The heat dissipation assembly includes a temperature controller 14 so as to prevent the working temperature inside the oxygen generator from exceeding a threshold value.

A fixed or detachable handle and belt lock catches 19 are disposed on the housing 1 for the convenience of carrying the whole oxygen generator easily.

What is claimed is:

1. A portable PSA oxygen generator comprising:
  a housing, at least one fixing board, and components including an air filter assembly, an oil-free compressor, a control valve assembly, a PSA oxygen generating assembly, an oxygen supply assembly, a heat dissipation assembly and an electric control assembly;
  wherein the oxygen generator further comprises at least one partition board, the at least one fixing board and the at least one partition board divide an interior of the housing into two or more separated spaces, so that said components are disposed within said two or more separated spaces by the sides of the at least one fixing board and/or the at least one partition board;
  wherein the oil-free compressor and the control valve assembly are disposed in one of the separated spaces isolated by the at least one fixing board and the at least one partition board; wherein the heat dissipation assembly includes a fan which is disposed on the partition board outside of the isolated space, so that air can be blown into the isolated space directly by an air outlet of the fan;
  wherein the PSA oxygen generating assembly includes absorbing tanks and a ventilating muffler, the ventilating muffler is disposed in another separated space isolated by another partition board, and the air which is blown into the isolated space by the fan goes through the ventilating muffler to be exhausted from an air outlet of the housing.

2. The portable PSA oxygen generator according to claim 1, wherein the control valve assembly consists of at least four micro two-position two-way electromagnetic valves which are connected in parallel, or consists of one or more micro two-position five-way pilot-operated air control valves which are connected in parallel.

3. The portable PSA oxygen generator according to claim 1, wherein the PSA oxygen generating assembly includes two or more absorbing tanks which are connected in parallel.

4. The portable PSA oxygen generator according to claim 1, wherein the electric control assembly provides a choice of three different types of power supplies including a rechargeable battery, a regulated power supply and a vehicle power supply.

5. The portable PSA oxygen generator according to claim 1, wherein the electric control assembly further includes pressure & oxygen sensors, and a negative pressure sensor so as to monitor system pressure, oxygen concentration and state of oxygen output to make sure supplying oxygen when inspiring and stop supplying when exhaling.

6. The portable PSA oxygen generator according to claim 1, wherein the heat dissipation assembly includes a temperature controller so as to prevent the working temperature inside the oxygen generator from exceeding a threshold value.

* * * * *